(12) United States Patent
Eckerström et al.

(10) Patent No.: US 12,128,783 B2
(45) Date of Patent: Oct. 29, 2024

(54) METHOD FOR OPTIMIZING ENERGY MANAGEMENT OF AN ELECTRICAL PROPULSION SYSTEM OF A VEHICLE

(71) Applicant: VOLVO TRUCK CORPORATION, Gothenburg (SE)

(72) Inventors: Ingemar Eckerström, Landvetter (SE); Jörgen Johansson, Svanesund (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 446 days.

(21) Appl. No.: 17/753,019

(22) PCT Filed: Aug. 21, 2019

(86) PCT No.: PCT/EP2019/072333
§ 371 (c)(1),
(2) Date: Feb. 15, 2022

(87) PCT Pub. No.: WO2021/032293
PCT Pub. Date: Feb. 25, 2021

(65) Prior Publication Data
US 2022/0281342 A1 Sep. 8, 2022

(51) Int. Cl.
*B60L 53/62* (2019.01)
*B60L 3/00* (2019.01)
(Continued)

(52) U.S. Cl.
CPC .............. *B60L 53/62* (2019.02); *B60L 3/0046* (2013.01); *B60L 3/0061* (2013.01); *B60L 3/12* (2013.01);
(Continued)

(58) Field of Classification Search
CPC .......... B60L 53/62; B60L 53/68; B60L 58/25; B60L 3/0046; B60L 3/0061
See application file for complete search history.

(56) References Cited

U.S. PATENT DOCUMENTS 10,802,457 B2 * 10/2020 Jefferies ................. G05B 19/05
11,362,615 B1 * 6/2022 Washabaugh ........... H02P 29/64
(Continued)

FOREIGN PATENT DOCUMENTS

CN 102472796 A 5/2012
CN 103427133 A 12/2013
(Continued)

OTHER PUBLICATIONS

Chinese Office Action dated Jun. 8, 2022 in corresponding Chinese Application No. 201980099400.3, 8 pages.
(Continued)

*Primary Examiner* — Scott Bauer
(74) *Attorney, Agent, or Firm* — Venable LLP; Jeffri A. Kaminski

(57) ABSTRACT

The invention relates to a method for optimizing energy management of an electrical propulsion system of a vehicle, wherein the electrical propulsion system of the vehicle comprises an energy storage system and an electric machine. The electrical propulsion system further comprises at least one electrical component, wherein the electrical component has an idle state and an operation state. The method comprising the steps of: a) determining at least one parameter of the electrical component being in the operation state; b) inputting the parameter into a thermal model of the electrical component; c) predicting the temperature $T_p$ of the electrical component being in operation state in real time on board the vehicle; d) comparing the predicted temperature value $T_p$ with a predefined threshold value $T_{max}$, and, e) automatically reducing the magnitude of the electrical current through the electrical component to a safe level if the predicted temperature value $T_p$ exceeds the predefined threshold value $T_{max}$.

16 Claims, 2 Drawing Sheets

(51) Int. Cl.
  *B60L 3/12* (2006.01)
  *B60L 53/68* (2019.01)
  *B60L 58/25* (2019.01)
(52) U.S. Cl.
  CPC ............... *B60L 53/68* (2019.02); *B60L 58/25* (2019.02); *B60L 2240/36* (2013.01); *B60L 2240/425* (2013.01); *B60L 2240/429* (2013.01); *B60L 2240/545* (2013.01); *B60L 2240/549* (2013.01)

(56) References Cited

U.S. PATENT DOCUMENTS

| | | | | |
|---|---|---|---|---|
| 2004/0264073 | A1* | 12/2004 | Zocholl | H02H 6/00 |
| | | | | 361/23 |
| 2008/0136377 | A1 | 6/2008 | Zhang | |
| 2011/0282508 | A1* | 11/2011 | Goutard | H02J 3/06 |
| | | | | 700/286 |
| 2012/0133337 | A1 | 5/2012 | Rombouts et al. | |
| 2015/0288213 | A1 | 10/2015 | van Lammeren et al. | |
| 2017/0179854 | A1* | 6/2017 | Freeman | H05B 47/105 |
| 2019/0262929 | A1* | 8/2019 | Mnich | H02M 3/157 |
| 2020/0076193 | A1* | 3/2020 | Biris | H02J 3/50 |
| 2021/0384559 | A1* | 12/2021 | Zhao | H01M 10/486 |

FOREIGN PATENT DOCUMENTS

| | | |
|---|---|---|
| CN | 104165660 A | 11/2014 |
| CN | 104247190 A | 12/2014 |
| CN | 204168246 U | 2/2015 |
| CN | 104566818 A | 4/2015 |
| CN | 104656026 A | 5/2015 |
| DE | 102012203219 A1 | 9/2013 |
| EP | 2842210 B1 | 3/2017 |

OTHER PUBLICATIONS

International Search Report and Written Opinion dated Jul. 23, 2020 in corresponding International PCT Application No. PCT/EP2019/072333, 10 pages.
International Preliminary Report on Patentability dated Aug. 6, 2021 in corresponding International PCT Application No. PCT/EP2019/072333, 14 pages.
European Office Action dated May 8, 2023 in corresponding European Patent Application No. 19759525.9, 5 pages.
Chinese Office Action dated Nov. 16, 2022 in corresponding Chinese Patent Application No. 201980099400.3, 12 pages.

* cited by examiner

METHOD FOR OPTIMIZING ENERGY MANAGEMENT OF AN ELECTRICAL PROPULSION SYSTEM OF A VEHICLE

CROSS-REFERENCE TO RELATED APPLICATIONS

This application is a U.S. National Stage application of PCT/EP2019/072333, filed Aug. 21, 2019 and published on Feb. 25, 2021, as WO 2021/032293 A1, all of which is hereby incorporated by reference in its entirety.

TECHNICAL FIELD

The invention relates to a method for optimizing energy management of an electrical propulsion system of a vehicle, wherein the electrical propulsion system of the vehicle comprises an energy storage system and an electric machine, wherein the electrical propulsion system further comprises at least one electrical component, wherein the electrical component has an idle state and an operation state. The invention further relates to a device for optimizing energy management of an electrical propulsion system of a vehicle, and a vehicle comprising such a device.

The invention can be applied in any type of electrical or hybrid vehicles, such as trucks, buses, cars and construction equipment.

BACKGROUND

In view of ever-increasing environmental concern due to global warming, automotive industry around the world has been focusing on minimizing or even eliminating emissions from vehicles. As the result of this focused research, the automotive industry is currently standing at the edge of disruption, wherein electrically driven vehicles are about to play a dominating role.

In view of the above, electric propulsion systems have to undergo constant development in order to fulfil requirements in terms of efficiency and safety. Presence of high currents in electric propulsion systems for vehicles requires use of components that are capable of handling such currents in order to avoid damage by overheating.

As is known, during the operation of electrical machines and other consumer loads an energy loss is generated. This so-called power dissipation PDiss is converted into heat and results in most cases in an undesired increase of the temperature T of the respective component.

Motor vehicle energy management systems are known. German patent document number DE 103 41 904 B4 discloses a system that compares the energy available in a motor vehicle with the energy required by the individual consumer loads. The non-safety-relevant components are switched off first in a rule-based manner or are supplied with energy in a delayed or throttled manner. In the event that the energy is still insufficient, the energy management system switches to an emergency program.

However, the use of finite state automations in connection with the energy management of electrical systems has a number of disadvantages. The preparation of control systems necessary for the operation, for example in the form of logic tables, is complicated. This is particularly true if a high number of consumer loads is present in the system or if a prediction of the behaviour of consumer loads is difficult, for example because they can have a wide range of power consumptions. In addition, finite state automations offer only discrete switching states. When states lying between two discrete switching states are desired, the finite state automation has to simulate these states accordingly, which makes it even more complex.

A further essential disadvantage is that in case of frequently switching power consumers, such systems become frequently active themselves, thus prioritized consumer loads are switched off and on again in short time intervals. Accordingly, limit cycles occur that in the short-term can result in an impairment in the fluent operation of the electrical system and long-term in a possible damage of the components of the system.

Another way to solve the problem of undesired temperature increase in the electrical components is oversizing the wires and components, such as relays and switches, in the electric propulsion system such that they can handle the unexpectedly high currents. Such oversizing leads to unnecessary high costs and increased weight of the system.

The purpose of the present invention is to overcome the above-identified problems and to use normally sized or undersized cables and components that are less costly.

SUMMARY

An object of the invention is providing a method for optimizing energy management of an electrical propulsion system of a vehicle. The object of the present invention is achieved by the method described below. The vehicle according to the present invention comprises an electric propulsion system, wherein the electric propulsion system in turn comprises an energy storage system and an electric machine. The electrical propulsion system further comprises at least one electrical component, wherein the electrical component has an idle state and an operation state. The method according to the present invention comprises the steps of:
  a) determining at least one parameter of the electrical component being in the operation state;
  b) inputting the parameter into a thermal model of the electrical component;
  c) predicting the temperature $T_p$ of the electrical component being in operation state in real time on board the vehicle;
  d) comparing the predicted temperature value $T_p$ with a predefined threshold value $T_{max}$,
  e) automatically reducing the magnitude of the electrical current through the electrical component to a safe level if the predicted temperature value $T_p$ exceeds the predefined threshold value $T_{max}$.

The electrical propulsion system in the context of the present invention typically comprises an electrical machine/electrical motor for providing power to the vehicle and an electrical energy storage system connected to the electrical machine/electrical motor to provide power to the electrical machine/motor. As such, the example embodiments of the invention include an electrical machine so as to permit the vehicle to propel at all speed ranges. The electrical motor can be provided in several different manners. According to one example embodiment, the electrical motor is any one of a permanent magnet synchronous machine, a brushless DC machine, an asynchronous machine, an electrically magnetized synchronous machine, a synchronous reluctance machine or a switched reluctance machine. Typically, the electrical motor is configured for driving at least a ground engaging member. Typically, the electric motor is configured for driving a pair of ground engaging members. By way of example, the ground engaging member is a wheel, a track or the like. The electrical motor can be coupled to the ground engaging members in several different manners. In one example embodiment, the electrical motor is coupled to a pair of ground engaging members by means of the gearbox assembly, a clutch and a differential, as is commonly known in the art of propulsion systems.

The term "energy storage system (ESS)" should in the following and throughout the entire description be interpreted as an electrical energy storage system comprising at least one battery pack with a plurality of rechargeable battery cells which, together with an electronic control unit (ECU), form a system which may be used for electrical propulsion of a vehicle, and/or for providing electric power to auxiliary loads, such as air conditioning system, pneumatics, or the like. The voltage of the ESS may be 400-1000 V.

It is known that batteries undergo power transfer. The power transfer should in the present context be interpreted as a charging or discharging cycle of the battery. Charging and discharging may also be referred to as power input to or output from the battery. The state of art provides several ways in which batteries may be charged, such as OppCharge, CCS, CHAdeMO or the like. When the energy level of a battery is low, the battery needs power input in order to restore its energy level. Usually, the battery receives power input from external power source, such as a power grid. A charging event may occur when the vehicle is at stand still, such as at a specifically assigned charging site, or during driving using an electrical road system (ERS) arranged in the ground or in the overhead lines.

As mentioned above, the external electric power source may be a power grid. Alternatively, the external electric power source may be a portable charging station, such as another vehicle. The connection of the vehicle to the external power source may be achieved through a plug-in contact, a pantograph or an ERS. Further, the connection of the vehicle to the external power source may be achieved inductively.

By the term "idle state" is meant a state of the electrical component wherein no electrical current is flowing through the component and wherein the component does not perform any operations.

By the term "operation state" is meant a state of the electrical component wherein electrical current is flowing through the component and wherein the component performs an operation.

Example of the electrical component in the context of the invention may be cables, wires, switches, relays, bus bars or the like.

According to step a) of the method of the present invention, at least one parameter of the electrical component being in the operation state is determined. Such a parameter may be the magnitude of the electrical current flowing through the electrical component.

In the next step b), the parameter of the electrical component determined above is used as input for a thermal model of the electrical component. The thermal model according to the present invention may be a computer model of an electrical component. Such a computer model will predict the temperature $T_p$ of the electrical component being in operation state in real time on board the vehicle according to step c) of the method of the present invention. Thus, the temperature of the electrical component is modeled with respect to current and possibly other parameters without the use of a temperature sensor.

In the next step d), the predicted temperature value $T_p$ is compared with a predefined threshold value $T_{max}$. The predefined threshold value $T_{max}$ is set to a temperature value that the electrical component is able to withstand without being damaged. The predefined threshold value $T_{max}$ may not be the same for different electrical components within the electrical propulsion system of the vehicle. If the predicted temperature value $T_p$ exceeds the predefined threshold value $T_{max}$, the magnitude of the electrical current through the electrical component is automatically reduced to a safe level as defined in step e). In this way, the electrical component will not get damaged by overheating.

The term "safe level" in the context of the present invention means the magnitude of the electrical current which does not cause a further increase in the temperature of the electrical component.

The term "reducing" or "reduced" according to the present invention means that the magnitude of the electric current is decreased. However, the magnitude of the electric current through the electrical component is always above zero after step e). In other words, the electrical component does not automatically enter into an idle state during step e).

As mentioned above, the parameter of the electrical component in step a) may be electrical current through the electrical component.

The at least one parameter mentioned in step a) above may also be the time during which the electrical component has been in operation state, ambient temperature in vicinity of the electrical component, and/or duration of the latest idle state period prior to the current operation state of the electrical component. In other words, the method may consider the cooling rate of the electrical component that has been in the idle state prior to the operation state. Variables used in the assessment of the cooling rate may be duration of the idle state period, ambient temperature in the vicinity of the electrical component, and duration of the current operation state period.

According to the method of the present invention, the magnitude of the electrical current through the electrical component in step e) may be reduced by limiting charging current or current to the electric machine.

The method of the present invention may comprise the step f) of calculating the time required to fully charge the energy storage system based on the predicted temperature $T_p$. This information may be used for scheduling a charging event, or may be communicated to the driver such that he may plan the next charging event. When such a charging event in scheduled or planned, capacity of the electrical grid may be taken into account in order to avoid overloading of the electrical grid and to optimize charging in terms of time and efficiency.

The method according to the present invention may further comprise the step g) of notifying the driver of the vehicle that the predicted temperature value $T_p$ exceeds the predefined threshold value $T_{max}$. Upon receiving such a notification, the driver may choose to stop the vehicle such that the electrical component having the predicted temperature value $T_p$ exceeding predefined threshold value $T_{max}$ enters the idle state, thus causing cooling of the electrical component. Alternatively, the driver may interrupt the ongoing charging event such that the electrical component enters the idle state and cooling is initiated. Further, the driver may choose to postpone a charging event until the electrical component has cooled such that the predicted temperature value $T_p$ is below the predefined threshold value $T_{max}$, which in turn leads to a decreased duration of the upcoming charging event.

The method of the present invention may further comprise the step h) of informing the driver of the vehicle when the predicted temperature value $T_p$ has reached the value below the predefined threshold value $T_{max}$. When such an information is received, the driver may start the vehicle again, or start a charging event.

It should be kept in mind that the steps g) and h) are entirely optional. In other words, the driver of the vehicle does not have to perform any action in order to avoid overheating of the electrical component. The method of the invention thus provides an automatic protection of the electrical component against overheating without putting the electrical component into idle state by using a thermal model of the electrical component, thus eliminating the need for a temperature sensor being connected to the electrical component.

The method of the present invention is particularly advantageous when the method is applied to a fleet of vehicles, comprising at least two vehicles. Each vehicle in the fleet of vehicles may be in communication with a remote control unit. The remote control unit may be operated by a fleet manager or by an electronic control unit (ECU).

The time required to fully charge the energy storage system of each of the vehicle in the fleet may be communicated to a remote control unit according to the step i). The remote control unit may then assign a time slot and/or location for charging of the vehicle according to step j). By using the method of the present invention for a fleet of vehicles, charging of the vehicles within the fleet may be optimized in terms of duration of each charging event and improved lifetime of the energy storage system of each vehicle within the fleet.

It should be noted that the steps of the method as described above may be performed in a consecutive manner. However, some steps of the method may be performed simultaneously. In particular, steps e), f), and g) may be performed simultaneously. Further, step g) may be performed before step f), and steps i) and j) may be performed before step g).

The present invention also relates to a device for optimizing energy management of an electrical propulsion system of a vehicle, wherein the electric propulsion system in turn comprises an energy storage system and an electric machine, wherein the electrical propulsion system comprises at least one electrical component, wherein the electrical component has an idle state and an operation state.

The device of the present invention further comprises at least one measuring unit for determining the at least one parameter of the electrical component, such as the magnitude of the electrical current flowing through the electrical component, the time during which the electrical component has been in operation state, ambient temperature in vicinity of the electrical component, and/or duration of the latest idle state period prior to the current operation state of the electrical component.

The device of the present invention comprises a control unit for predicting the temperature $T_p$ of the electrical component being in operation state in real time on board the vehicle, for comparing the predicted temperature value $T_p$ with a predefined threshold value $T_{max}$, and for automatically reducing the magnitude of the electrical current through the electrical component to a safe level if the predicted temperature value $T_p$ exceeds the predefined threshold value $T_{max}$.

As mentioned above, the electrical component may be a transfer element for electrical energy, such as a wire, a cable, a relay, a bus bar or a consumer load.

According to the present invention, the device may further comprise a means for communication with the driver of the vehicle and/or means for communication with a remote control unit.

The present invention relates to a vehicle comprising a device described above. The vehicle may be a part of a vehicle fleet.

Finally, the present invention relates to a computer program comprising program code means for performing the steps of the method described above when the program is run on a computer, and to a computer readable medium carrying such a computer program.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims.

Figure 1:
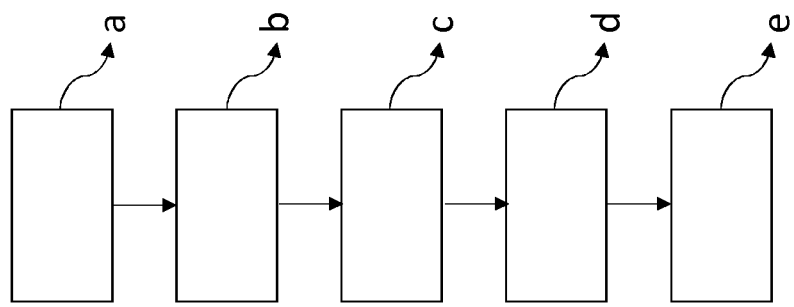
FIG. 1 is a flowchart of the steps of the method according to one embodiment of the present invention.

FIG. 1 depicts a flowchart of the steps a)-e) of the method of the present invention.

According to step a) of the method of the present invention, at least one parameter of the electrical component being in operation state is determined. Usually, such a parameter may be the magnitude of the electrical current flowing through the electrical component.

In the next step b), the parameter of the electrical component determined above is used as input for a thermal model of the electrical component. The thermal model according to the present invention may be a computer model of an electrical component. Such a computer model will predict the temperature $T_p$ of the electrical component being in operation state in real time on board the vehicle according to step c) of the method of the present invention.

In the next step d), the predicted temperature value $T_p$ is compared with a predefined threshold value $T_{max}$. If the predicted temperature value $T_p$ exceeds the predefined threshold value $T_{max}$, the magnitude of the electrical current through the electrical component is automatically reduced to a safe level as defined in step e). As mentioned above, the magnitude of the electrical current is always kept above zero, i.e. the electrical component never automatically enters the idle state.

Figure 2:
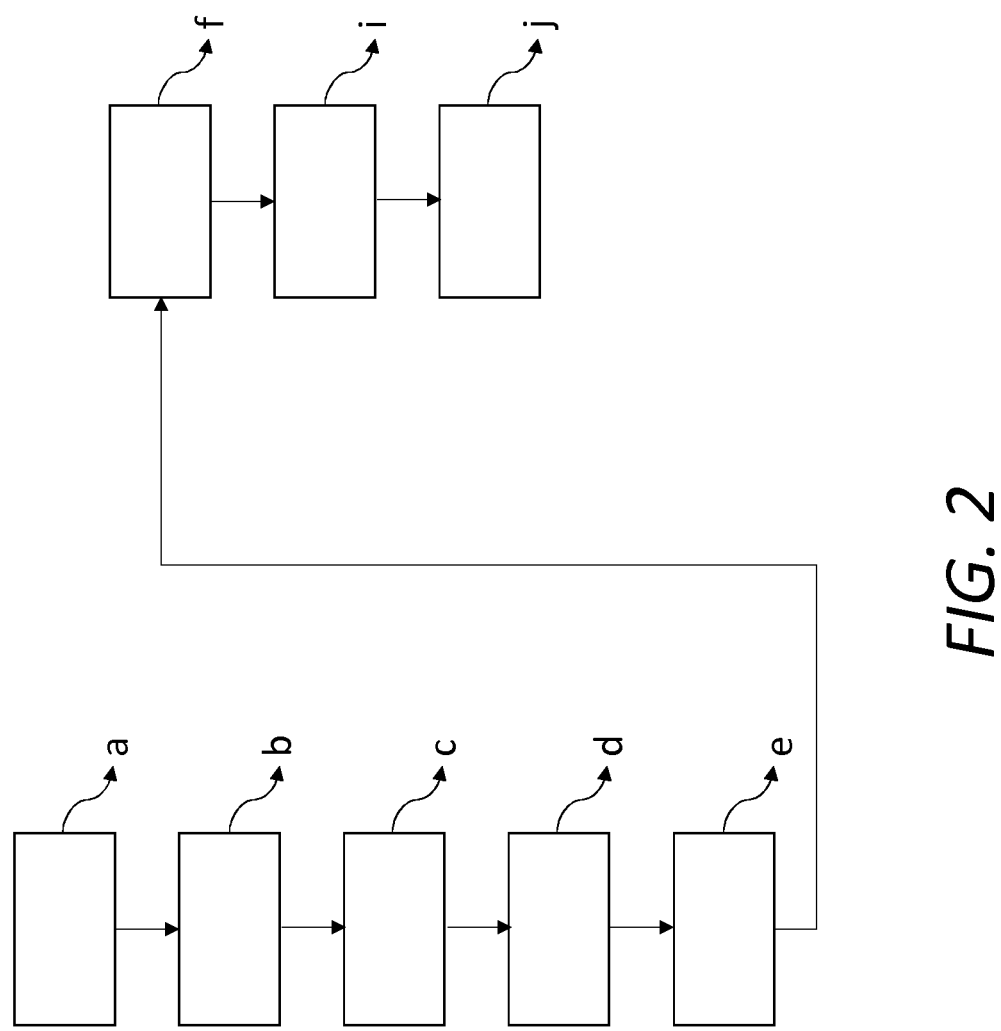
FIG. 2 is a flowchart of the steps of the method according to another embodiment of the present invention.

FIG. 2 shows another embodiment of the method of the present invention. The embodiment shown in FIG. 2 may be used when managing a fleet of vehicles.

The method according to the embodiment depicted in FIG. 2 comprises the steps a)-e) as disclosed above. Once the magnitude of the electric current is reduced to a safe level, the predicted temperature value $T_p$ may be used for calculating the time required to fully charge the energy storage system based on said predicted temperature $T_p$ according to step f). The time thus calculated is communicated to a remote control unit, possibly together with the value of state of charge (SOC) of the energy storage system (step i)). Based of the above parameters, the remote control unit then assigns a time slot and/or location for charging of the vehicle, thus optimising energy management of the entire vehicle fleet (step j))

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A method for optimizing energy management of an electrical propulsion system of a vehicle, wherein said electrical propulsion system of the vehicle comprises an energy storage system and an electric machine, wherein said electrical propulsion system further comprises at least one electrical component, wherein said electrical component has an idle state and an operation state, said method comprising the steps of:
    a) determining at least one parameter of said electrical component being in said operation state, wherein said at least one parameter is at least electrical current through said electrical component and the time during which said electrical component has been in the operation state;
    b) inputting said parameter into a thermal model of said electrical component;
    c) predicting the temperature $T_p$ of said electrical component being in operation state in real time on board the vehicle;
    d) comparing the predicted temperature value $T_p$ with a predefined threshold value $T_{max}$, and,
    e) automatically reducing the magnitude of the electrical current through said electrical component to a safe level if said predicted temperature value $T_p$ exceeds said predefined threshold value $T_{max}$.

2. The method according to claim 1, wherein said at least one parameter is ambient temperature in vicinity of said electrical component, and/or duration of the latest idle state period prior to the current operation state of said electrical component.

3. The method according to claim 1, wherein the magnitude of the electrical current through said electrical component in step e) is reduced by limiting charging current or current to an electric machine.

4. The method according to claim 1, wherein said method further comprises the step of:
    f) calculating the time required to fully charge said energy storage system based on said predicted temperature $T_p$.

5. The method according to claim 1, wherein said method further comprises the step of:
    g) notifying the driver of said vehicle that said predicted temperature value $T_p$ exceeds said predefined threshold value $T_{max}$.

6. The method according to claim 1, wherein said method further comprises the step of:
    h) informing the driver of said vehicle when said predicted temperature value $T_p$ has reached the value below said predefined threshold value $T_{max}$.

7. The method according to claim 1, wherein said method further comprises the steps of:
    i) communicating said time required to fully charge said energy storage system to a remote control unit;
    j) assigning by said remote control unit a time slot and/or location for charging of said vehicle.

8. A computer readable medium carrying a computer program comprising program code means for performing the steps of claim 1 when said program product is run on a computer.

9. A device for optimizing energy management of an electrical propulsion system of a vehicle, wherein said electrical propulsion system of the vehicle comprises an energy storage system and an electric machine, wherein said electrical propulsion system further comprises at least one electrical component, wherein said electrical component has an idle state and an operation state, wherein said device further comprises:
    at least one measuring unit for determining at least one parameter of said electrical component, wherein said at least one parameter is at least electrical current through said electrical component and the time during which said electrical component has been in the operation state, a control unit for predicting the temperature $T_p$ of said electrical component being in operation state in real time on board the vehicle, wherein said predicting is performed using a thermal model of said electrical component based on said at least one parameter as input for said thermal model of said electrical component; for comparing said predicted temperature value $T_p$ with a predefined threshold value $T_{max}$; and for automatically reducing the magnitude of the electrical current through said electrical component to a safe level if said predicted temperature value $T_p$ exceeds said predefined threshold value $T_{max}$.

10. The device according to claim 9, wherein said at least one electrical component is a transfer element for electrical energy.

11. The device according to claim 9, wherein said control unit calculates the time required to fully charge said energy storage system based on said predicted temperature $T_p$.

12. The device according to claim 9, wherein said device further comprises a means for communication with the driver of said vehicle.

13. The device according to claim 9, wherein said device further comprises means for communication with a remote control unit.

14. A vehicle comprising a device according to claim 9.

15. A vehicle according to claim 14, wherein said vehicle is a part of a vehicle fleet.

16. A computer program comprising program code means for performing the steps of claim 1 when said program is run on a computer.

\* \* \* \* \*